INVENTOR.
PAUL F. BURCH
BY Price & Heneveld
ATTORNEYS

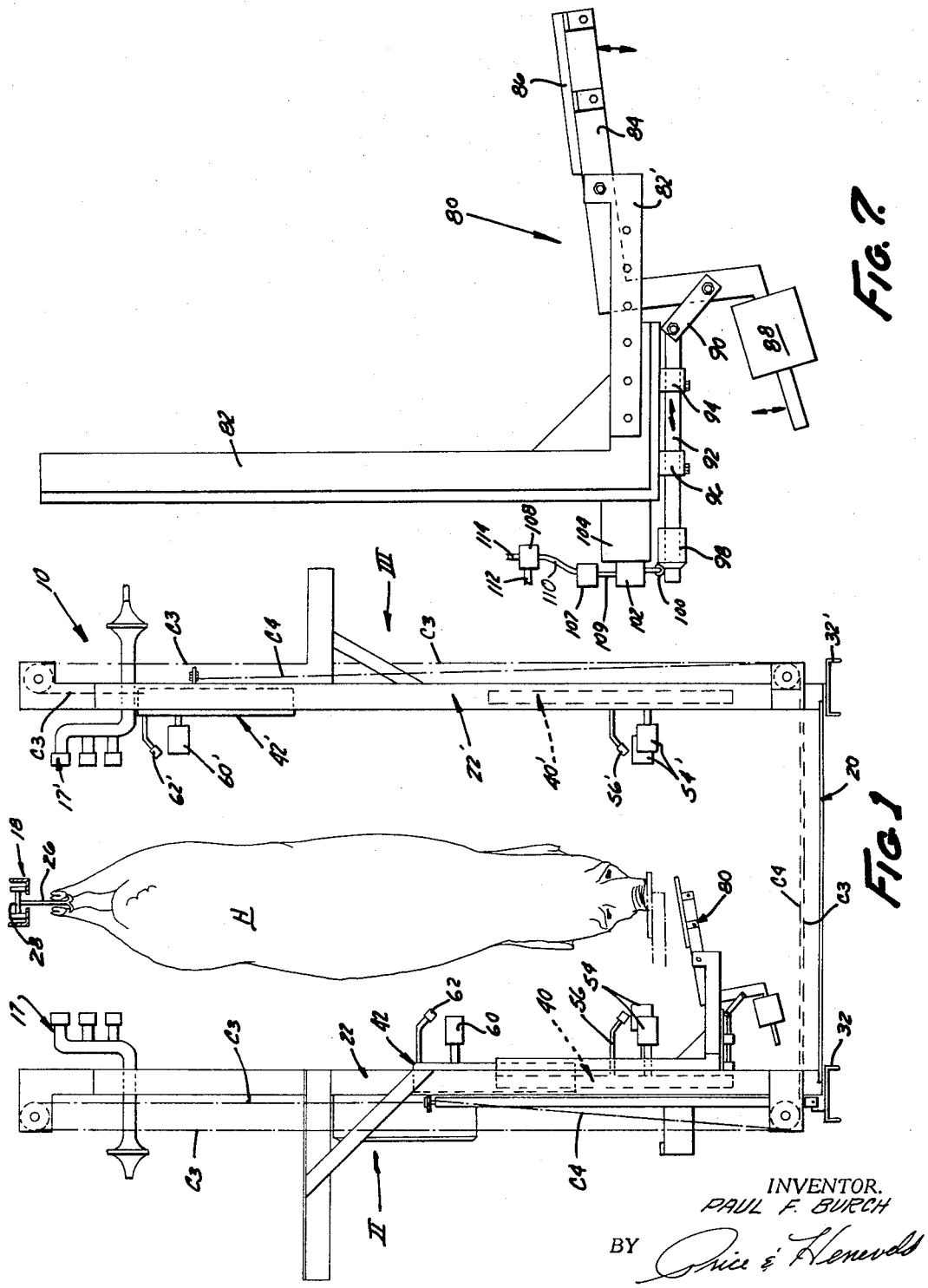

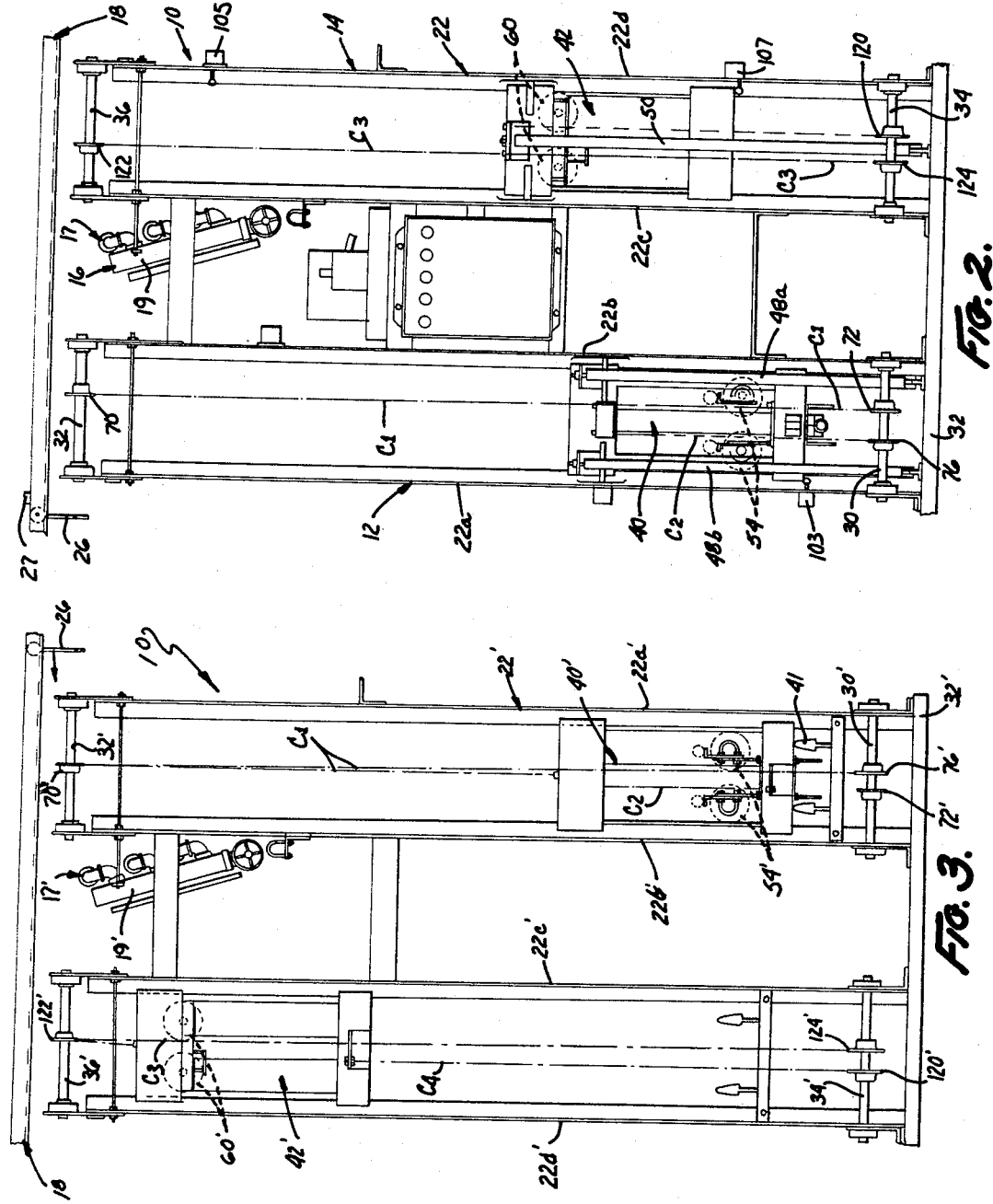

United States Patent Office 3,397,423
Patented Aug. 20, 1968

3,397,423
SINGEING MACHINE AND METHOD
Paul F. Burch, Rockford, Mich., assignor to Wolverine
World Wide, Inc., a corporation of Michigan
Filed Feb. 7, 1966, Ser. No. 525,739
6 Claims. (Cl. 17—20)

ABSTRACT OF THE DISCLOSURE

This specification discloses carcass singeing, especially for hogs, wherein the body and head portions are singed separately, the body portions being singed by alternately oscillating, vertically traveling burners on support carriages, and the head and neck portions being singed by directly opposite, carriage mounted head burner means creating a high heat zone properly located by being elevated when a detector engages the hog snout.

---

This invention relates to animal singeing apparatus, and particularly to hog carcass, continuous, singeing equipment which provides exceptionally accurate control over the degree of singeing af various portions of the hog carcasses passing through the equipment, even though the carcasses are of different lengths.

In the production line of packing houses, after the hogs are killed and bled, they are conventionally singed to remove bristles. This singeing operation is largely done by hanging the hog carcass from its rear hocks, head down, and placing it in an enclosing cabinet where flames are blasted against its carcass over its length for a period of time. The flames are from vertically elongated burners fixed to be oriented toward the hog carcass from opposite sides. Each vertical bank of burners is conventionally formed by several outlet ports in common vertically elongated manifold pipes. While this singeing technique using this type of equipment causes singeing of most bristles, it is prone to leave bristles in certain areas such as around the face and ear areas, and around the bung. It also tends to overburn other valuable areas such as the main body portion. More specifically, because of the surface roughness of the skin folds, ears, and other head and facial surface areas at various angles to each other, the head bristles are very difficult to remove by singeing. Yet, for optimum sanitation, these should be removed.

Another problem area on the hog carcass that is difficult to completely singe is that adjacent the hams, i.e. from the bung hole to the rear hocks.

Another related disadvantage of the conventional cabinet singeing technique is the relatively low production rate involved.

However, if the hog carcass is kept in the conventional singeing cabinet long enough to properly singe off these facial, head, and bung bristles, the remainder of the carcass is overheated, causing damage to the meat and hide.

It is an object of this invention to provide novel singeing apparatus effecting controlled singeing of all portions of the carcass, whether the portions are difficult to singe such as the head and face areas or the ham areas, or which must be carefully protected against overheating such as the main carcass portions from the neck to the hams.

Another object of this invention is to provide a novel singeing apparatus which effects complete singeing of the head and facial portions without detrimentally affecting the meat or hide on the body, no matter what the length of the carcass.

Another object of this invention is to provide a novel singeing apparatus enabling optimum singeing of the body without overheating, complete singeing of the head and ham areas, and also enabling continuous advancement of the carcass through the equipment and along the packing house production line conveyor so that one carcass after another can be passed through the singeing apparatus continuously.

Another object of this invention is to provide a unique hog carcass singeing apparatus that automatically effects exact and controlled singeing of all carcass portions, including the head, even though the head of each hog which consecutively passes through the singeing apparatus is at a different height because of varying lengths of the hogs being processed while hanging from their hocks.

Another object of this invention is to provide a hog carcass singeing apparatus that achieves concentrated and complete blast singeing of the hog head, automatically, no matter what height the head is above the floor or below the overhead conveyor on which the carcass is suspended.

Another object of this invention is to provide a novel method of singeing hogs to obtain complete singeing of the difficult head and ham areas, yet without overheating the main carcass portions to cause damage to the meat and/or hide.

These and other objects of this invention will become apparent upon studying the following specification in conjunction with the drawings in which:

FIG. 1 is an end elevational view of the apparatus, viewed from the discharge end;

FIG. 2 is a side elevational view of the apparatus in FIG. 1, taken in the direction indicated by the arrow II in FIG. 1;

FIG. 3 is a side elevational view of the apparatus in FIGS. 1 and 2, taken in the direction indicated by the arrow III in FIG. 1;

FIG. 7 is an enlarged side elevational view of the snout contacting, heat singeing burner actuation and control means of the assembly.

Figure 4:
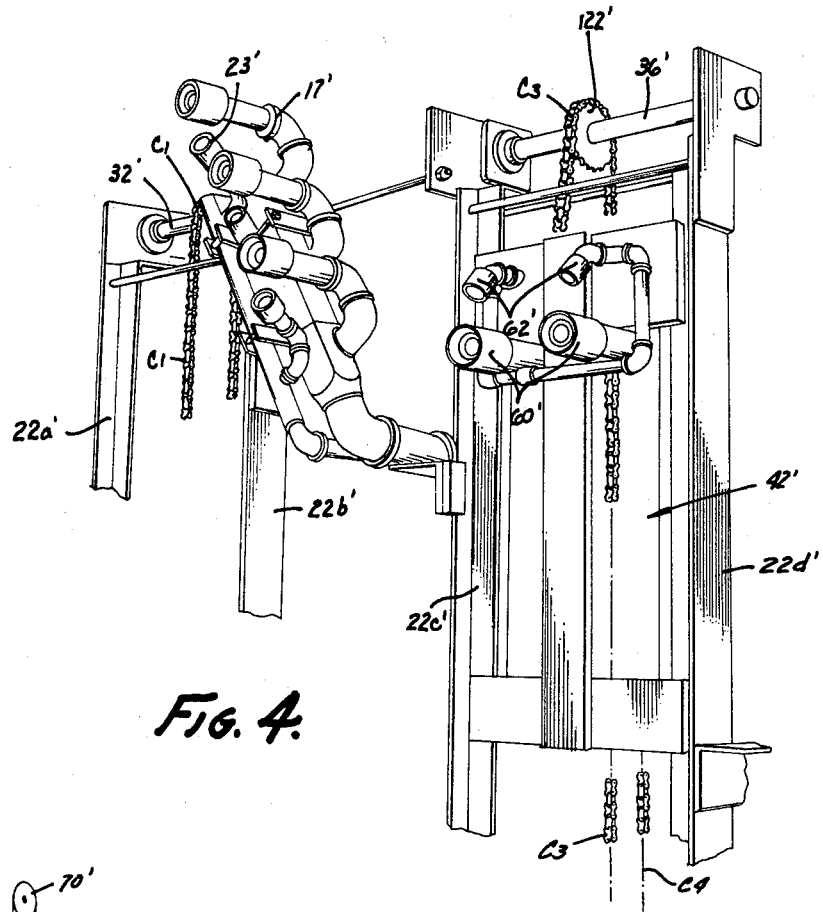
FIG. 4 is a fragmentary enlarged perspective view of a portion of the apparatus in FIGS. 1 through 3.

Referring now specifically to the drawings, the complete singeing apparatus assembly 10 includes a head singeing subassembly 12, a body singeing subassembly 14, supplemental ham singeing subassembly 16, and a conveyor subassembly 18 for advancing hog carcasses H through the assembly. The supporting framework for assembly 10 is basically of U-shaped configuration, including a lower cross leg 20 (FIG. 1), and spaced upstanding supports 22 and 22'. Supports 22 and 22' form a passageway therebetween for the caracasses to travel through hung by the rear hocks to suspension element 26 of trolleys 28 on conveyor means 18. Cross leg 20 includes floor contacting supports 32 and 32'. If desired, overhead interconnecting beams (not shown) may be secured between the upper ends of supports 22 and 22'.

As shown in FIGS. 2 and 3, support 22 may actually include a plurality of upright, spaced, vertical L-shaped brackets 22a, 22b, 22c and 22d, while support 22' includes a plurality of like brackets 22a', 22b', 22c' and 22d'. Brackets 22a and 22a', 22b and 22b', 22c, and 22c', and 22d and 22d' are respectively opposite each other.

Mounted between the lower ends of brackets 22a and 22b is a rotational shaft 30, and between the upper ends, rotational shaft 32. Between the lower ends of supports 22c and 22d is rotational shaft 34, and between the upper ends, rotational shaft 36. Likewise, on the opposite side of the path of travel of carcass H, between the lower ends of supports 22a' and 22b' is a rotational shaft 30', between the upper ends rotational shaft 32'. Between the lower ends of supports 22c' and 22d' is rotational shaft 34', and between the upper ends, rotational shaft 36'.

Also suspended between supports 22a and 22b is a vertically slidable carriage 40, and opposite to this, between supports 22a' and 22b' a vertically slidable carriage 40'. On these carriages 40 and 40' are mounted traveling head singeing means to be described more fully hereinafter. Between supports 22c and 22d is mounted a vertically slidable carriage 42, and between supports 22c' and 22d' is mounted a vertically slidable carriage 42'. The supports act as guide rails for these carriages in their vertical movement. Carriages 42 and 42' serve as supports for the traveling body singeing burners as described more fully hereinafter.

Carriage 40 is vertically moved during operation by a pair of upright fluid cylinders 48a and 48b connected between the upper end of carriage 40 and the floor mount 32. Vertical movement of carriage 40 is accompanied by like vertical movement of carriage 40' because of a special connection between these two carriages by a pair of flexible elements such as chains C1 and C2 to be described more fully with respect to FIG. 5 hereinafter.

Carriage 42 is vertically moved by an elongated fluid cylinder 50 extending between the upper end of the carriage and floor mount 32. Movement of carriage 42 is accompanied by opposite movement of carriage 42' because of a special interconnection between these two carriages by flexible tensile elements such as chains C3 and C4 to be described more fully hereinafter.

Mounted to carriage 40 to move therewith is a pair of flame burners 54 which project inwardly toward the passage between the straddling components of the assembly. Likewise, mounted to carriage 40' is a like pair of burners 54' projecting toward the passage. Burners 54 have pilot burner means 56 adjacent thereto, and burners 54' have pilot burner means 56' adjacent thereto mounted to respective carriages 40 and 40'. These burners 54 and 54' serve the purpose of singeing the facial and head area of the hog carcass in a special manner to be described hereinafter.

Carriage 42 has mounted thereon a pair of burners 60, and pilot burner means 62 adjacent thereto, while carriage means 42' has a pair of burners 60' and pilot burner means 62'. These burners are likewise oriented generally toward the opposite side of the assembly, i.e. toward the passageway between them through which the hog carcass passes.

Figure 5:
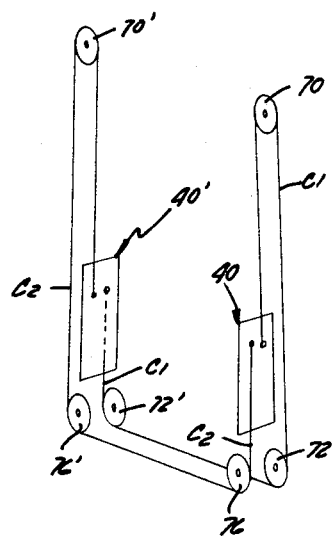
FIG. 5 is a schematic perspective view of the interconnections of the head singeing portion of the assembly.

As noted previously, a pair of chains C1 and C2 interconnect carriages 40 and 40'. Chain C1 has one end secured to carriage 40, then extends upwardly therefrom up around the sprocket 70 mounted on shaft 32 (FIG. 2), then extends downwardly around upper sprocket 72 mounted on shaft 30, then beneath the passage and around lower sprocket 72' on shaft 30' (FIG. 3) and has its second end secured to carriage 40' (FIG. 5). Chain C2 has one end secured fixedly to carriage 40, extends downwardly round sprocket 76 on shaft 30, then beneath the passage and around opposite sprocket 76' on shaft 30', then upwardly to overhead sprocket 70' on shaft 32' and then downwardly to have its opposite end secured to carriage 40'. By studying these drawings, it will be seen that when carriage 40 is elevated, carriage 40' is elevated a like amount so that these carriages are always opposite each other. Thus burners 54 and 54' are always opposite each other to form an extra hot zone where the flame jets meet around the facial, neck, and head areas of the hog. In actual practice, cylinders 48a and 48b that shift carriages 40 and 40' have a variable automatically controlled stroke so that only the neck, head and snout areas of the hog are subjected to the extra high heat involved. The carriage travel is specifically controlled with respect to each particular hog by a special snout actuated control subassembly 80.

This control assembly includes an L-shaped frame support 82 that is mounted to move with carriage 40, and has a lower generally horizontal leg 82' that extends somewhat into the passageway between the two straddling parts of the assembly. Pivotally mounted on this leg 82' is an L-shaped bracket 84 which has a hog snout contacting actuator or trigger plate 86 generally in the center of the passageway through which the hog carcass passes. This bracket is pivotally mounted to leg 82' and has its lower leg depending so that a counter-biasing weight 88 can be mounted thereto to bias snout contacting plate 86 in its normal elevated position as shown in FIG. 7. Raising support 82 with hoisting of carriage 40 will cause plate 86 to contact the snout of a suspended inverted hog (as shown in FIG. 1 in phantom), to pivot plate 86 downwardly to a generally horizontal position, against the bias of weight 88. This pushes the link 90 which is pivotally connected on one end to bracket 84, and pivotally mounted on the opposite end to a rod 92. The rod is slidable along its length in bearings 94 and 96, and contains a switch actuation collar 98 on the opposite end for engagement with the finger 100 of a microswitch 102. Switch 102 is secured by mount 104 to the support 82. Microswitch 102 actuates, through electrical leads 109, a timer 107, which, when actuated, times out in about 4 seconds, to then actuate fluid valve 108 through leads 110, to control flow of fluid of supply line 112 through conduit 114 to cylinders 48a and 48b so that, when the snout contact actuates mechanism 80, elevation of burners 54 and 54' (and of carriages 40 and 40') is stopped, held for the several second interval, and reversed, to revert to the initial lowered position. Hence, the extra high heat burners only proceed as far as the neck area of the hog. Suitable stops e.g. stops 41 for carriage 40' cushion the descent of the carriages.

After the hog carcass passes on support 26 (FIG. 2), through head singeing subassembly 12, it passes through ham singeing subassembly 16, then through body singeing subassembly 14.

The ham singeing subassembly 16 is basically composed of oppositely positioned, stationary mounted burners. More specifically, referring to FIGS. 2 and 3, it includes a first plurality of inwardly projecting burners 17 arranged vertically and somewhat diagonally with respect to each other, on fixed support 19 secured to the framework, and a second plurality of opposite burners 17' arranged likewise, on fixed support 19'. These burners normally fire constantly and do not travel, but are oriented directly on the ham areas which stay generally in the same position vertically of the apparatus regardless of the length of the carcass being treated. Each has its own pilot burner also, e.g. pilot burner 23' (FIG. 4).

Figure 6:
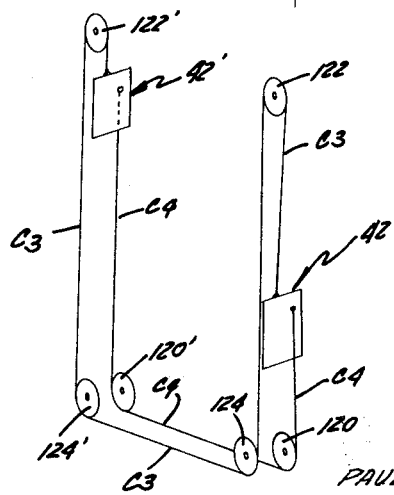
FIG. 6 is a schematic perspective view of the interconnections between the body singeing burner supports in the assembly.

As the hog carcass passes ham burners 17 and 17', it passes between body burners 60 and 60', and their respective supporting traveling carriages 42 and 42'. Proper singeing of the body demands that it not be overheated or overburned, so to speak. It has been found that optimum singeing without overheating occurs when the special body burners are traveling vertically over the body portion of the carcass, and travel in opposite directions of each other in their reciprocable patterns. More specifically, as carriage 42 is vertically elevated and then subsequently lowered under the action of elongated fluid cylinder 50, opposite carriage 42' is vertically lowered and subsequently elevated. This is achieved by connecting the two chain elements C3 and C4 between the carriages in the manner shown in FIG. 6. That is, one end of chain C4 is secured fixedly to carriage 42 then extends downwardly around sprocket 120 on shaft 34, then across beneath the passage for the hog carcass to sprocket 120' on shaft 34', then upwardly to be secured at its opposite end to carriage 42'. The chain C3 is secured on one end to carriage 42, then extends upwardly around sprocket 122 on shaft 36, then down around past the carriage to lower sprocket 124 on shaft 34, then across beneath the passage to sprocket 124' on shaft 34', then up around overhead sprocket 122' on shaft 36', then back around down to a fixed attachment to carriage 42'. Thus, with elevation of carriage 42, carriage 42' lowers, and vice versa. These carriages are reciprocated constantly during the continuous passage of a hog carcass therebetween, for continuous controlled flaming of the body portion of the carcass as it passes.

In operation, the hogs which have been killed and bled are hung up by their hocks, snout downwardly on continuous conveyor 18 and pass consecutively one at a time through singeing apparatus 10. The burners of the singeing assembly remain in operation while the hog carcasses are conveyed through. As each hog carcass H passes between the two straddling components of the assembly, the head is first specially singed, then the hams, then the body.

More specifically, as the carcass begins to pass into subassembly 12, its trolley trips a limit switch 27 (FIG. 2) on conveyor 18 to actuate valve 108 (FIG. 7), enabling fluid to pass to and extend cylinders 48a and 48b that elevate carriages 40 and 40'. As soon as these carriages, and the respective burners 54 and 54' are elevated to a position where snout plate 86 (FIG. 7) of mechanism 80 contacts the snout of the hog and pivots to the flat position, mechanism 80 actuates timer 107 which times out and trips limit switch 102 which shifts valve 108, to reverse the fluid pressure to cylinders 48a and 48b, causing the platform and the burners to stop and lower back to the original position. Upon being lowered carriage 40 hits another limit switch 103 (FIG. 2) to shut off valve 108 so that the carriages 40 and 40' remain stationary. The platform and mechanism 80 then remain in this lowered position until the next hog carcass actuates limit switch 27.

Upon passage of the hog carcass between ham burners 17 and 17', they project flame against the ham areas. Since these are opposite each other, the ham areas are subjected to an intense heat to burn the hair off the creases, etc. which are normally difficult to singe. It does not matter if this area is overheated somewhat, since the hams are normally subsequently treated with heat anyway, and are not subject to damage with this extra singeing heat.

As the hog carcass passes between burners 60 and 60' of body singeing subassembly 14, these burners are continuously being raised and lowered in opposite motions, to sweep singeing flames up and down both sides of the hog carcass body. This singes the hair off the body without overheating this valuable area to cause possible damage to the meat and/or skin. The reversing action of carriages 42 and 42' is achieved by constantly extending and contracting cylinder 50 by a fluid control valve (not shown) which is constantly reversed by upper and lower limit switches 105 and 107 contacted alternately by carriage 40. The hog carcass then passes out of the assembly, while the next hog carcass is following it through.

The mechanism is substantially automatic, enables continuous singeing, yet with complete effective control over the assembly to achieve optimum singeing in all areas for sanitation, yet without damage to valuable areas. It will be realized that each hog carcass passing through the equipment is normally of a different length than the preceding and following hog carcasses. This snout actuated head singeing assembly obtains effective concentrated singeing of all head, face and neck areas for burning off all of the hair for sanitary purposes, even though the head will be at a different height for each different length hog carcass. Yet, even though a completely effective burning of the head occurs, none of the valuable body areas is excessively burned to damage the meat or hide. The head area is actually not of much value, and can be overburned without loss. Further, the hams are always effectively singed, yet without overheating damage to the body areas occurring.

Various additional advantages to those specifically noted hereinabove may occur to those in this art upon studying the foregoing description. It is also conceivable that the apparatus may be modified somewhat in detail without departing from the basic concepts behind the novel structure and method. Hence, the invention is intended to be limited only by the scope of the appended claims and the reasonably equivalent structures and methods to those defined therein.

I claim:

1. Hog singeing apparatus for use astraddle the path of travel of hog carcasses suspended head down from a conveyor, comprising: support framework; first, vertically movable, head area burner means on said framework; power means operably associated with said head area burner means for vertical movement thereof; burner height control means operably associated with said power means and responsive to the vertical location of a carcass head to limit the elevation of said head area burner means with respect to the head and neck height of any particular hog carcass; and body area burner means on said framework, generally above the level of said head area burner means, to singe hair on the main body portion of the carcass.

2. The apparatus in claim 1 including powered vertically traveling carriage means mounting said body area burner means.

3. The apparatus in claim 1 including a generally horizontally traveling carcass conveyor means for advancing carcasses suspended therefrom head down; said singeing burner means being on opposite sides of said path, oriented toward said path; and actuating means adjacent said conveyor means and operably associated with said power means to initially actuate said power means with the advancement of a carcass near said burner means.

4. The singeing apparatus in claim 1 wherein said control means includes vertically movable carriage means, and hog snout detector means on said carriage means; said power means forming carriage shifting means between said carriage means and said framework; actuating means for said shifting means activated by the presence of a hog at said head area burner means to cause said carriage means to vertically rise; and said detector means being operably asociated with said actuating means to limit the rising of said carriage means with detection of a hog's snout, to thereby limit the singeing by said head area burner means to the hog's head and neck.

5. The apparatus in claim 4 wherein said detector means includes a snout contactor, shiftable trigger means operably associated with said snout contactor, timer means actuated with shifting of said trigger means and operably associated with said power means, to retain said head area burner means at the hog head for a predetermined time and then actuate lowering of said carriage means.

6. Carcass singeing apparatus for combining with a conveyor for advancing in a path carcasses suspended therefrom head down: first carcass-straddling, lower, head area burner means for singeing hair on the carcass head portion; and second, carcass-straddling, upper, body area burner means for singeing hair on the carcass body portion, wherein said head area burner means and body area burner means each have first and second sets of spaced burners astraddle the carcass conveyed therebetween; first vertically movable carriages mounting said first and second head burner sets; means to move said first carriages vertically up, simultaneously, and directly opposite each other, to eject flame from said head singeing burner means on the head of the conveyed carcass to form a high heat zone; vertical movement control means operably arranged to limit the upward vertical movement of said first carriages to the head and neck of the carcass; second vertically movable carriages mounting said first and second body area burner sets; and power means to move said second carriages vertically up and down in alternate oscillatory fashion, to enable said body burners to continuously traverse the carcass body for regulated singeing.

References Cited

UNITED STATES PATENTS

| | | | |
|---|---|---|---|
| 1,530,022 | 3/1925 | Van Dusen | 17—20 |
| 2,152,554 | 3/1939 | Lockwood | 263—8 |
| 2,393,521 | 1/1946 | Duncan et al. | 263—8 |
| 2,602,185 | 7/1952 | Johnson | 17—11 |

LUCIE H. LAUDENSLAGER, *Primary Examiner.*